United States Patent [19]

Frus

[11] Patent Number: 5,523,691
[45] Date of Patent: Jun. 4, 1996

[54] DIAGNOSTIC DEVICE FOR GAS TURBINE IGNITION SYSTEM

[75] Inventor: John R. Frus, Jacksonville, Fla.

[73] Assignee: Unison Industries Limited Partnership, Jacksonville, Fla.

[21] Appl. No.: 458,091

[22] Filed: Jun. 1, 1995

Related U.S. Application Data

[62] Division of Ser. No. 271,519, Jul. 7, 1994, which is a division of Ser. No. 958,644, Oct. 7, 1992, Pat. No. 5,343,154, which is a continuation of Ser. No. 557,973, Jul. 26, 1990, Pat. No. 5,155,437.

[51] Int. Cl.$^6$ ................................................. G08B 21/00
[52] U.S. Cl. ......................... 324/384; 324/399; 324/393; 73/118.1
[58] Field of Search ........................... 73/118.1; 324/399, 324/393, 384

[56] References Cited

U.S. PATENT DOCUMENTS

| 2,192,932 | 3/1940 | Peters et al. . |
| 2,651,005 | 9/1953 | Tognola . |
| 2,938,147 | 5/1960 | Rose . |
| 3,470,386 | 9/1969 | Potts et al. . |
| 3,504,490 | 4/1970 | Klamm . |
| 3,551,800 | 12/1970 | Widmer . |
| 3,600,887 | 8/1971 | Gault et al. . |
| 3,629,652 | 12/1971 | Maycock et al. . |
| 3,793,582 | 2/1974 | Maria et al. . |
| 3,793,583 | 2/1974 | Glomski et al. . |
| 3,793,584 | 2/1974 | Liebermann et al. . |

(List continued on next page.)

FOREIGN PATENT DOCUMENTS

| 0020069 | 11/1983 | European Pat. Off. . |
| 0125820 | 11/1984 | European Pat. Off. . |
| 0125820 | 6/1988 | European Pat. Off. . |
| 0277468 | 8/1988 | European Pat. Off. . |
| 0362014 | 4/1990 | European Pat. Off. . |
| 0369236 | 5/1990 | European Pat. Off. . |
| 0226302 | 5/1990 | European Pat. Off. . |
| 0384436 | 8/1990 | European Pat. Off. . |
| 2040913 | 2/1972 | Germany . |
| 3347235 | 5/1984 | Germany . |
| 57-032070 | 2/1982 | Japan . |
| 637286 | 5/1950 | United Kingdom . |
| 1182726 | 3/1970 | United Kingdom . |
| 1334230 | 10/1973 | United Kingdom . |
| 1400446 | 7/1975 | United Kingdom . |
| 1464477 | 2/1977 | United Kingdom . |
| 1537278 | 12/1978 | United Kingdom . |
| 1551746 | 8/1979 | United Kingdom . |
| 2064138 | 6/1981 | United Kingdom . |
| 2130751 | 6/1984 | United Kingdom . |

OTHER PUBLICATIONS

IEEE Standard Dictionary of Electrical and Electronics Terms (4th Ed.), 1988, p. 901 (month unavailable).

(List continued on next page.)

Primary Examiner—Kenneth A. Wieder
Assistant Examiner—Jose M. Solis
Attorney, Agent, or Firm—Leydig, Voit & Mayer, Ltd.

[57] ABSTRACT

A device for diagnosing the state of health of an ignition system is provided, where the system includes at least one spark producing channel comprising an exciter, output circuit and igniter plug. The device provides a diagnosis of the state of health for both the exciter and igniter plug by monitoring the high energy pulses at the output of the exciter. By monitoring the ignition system at an intermediate point in the system such as the output of the exciter, the sensor and electronics of the device may be completely contained within the electronic environment of the exciter, thereby avoiding any need for attaching sensors at the output of the system adjacent to the igniter plug in order to diagnose the plug's state of health. As an alternative to the device being built into the ignition system, it can be incorporated into automatic test equipment that produces high energy pulses for delivery to an igniter plug to be tested. The device is capable of diagnosing failure of either the exciter or the igniter plug and may also be configured to detect the impending failure of the plug.

1 Claim, 4 Drawing Sheets

U.S. PATENT DOCUMENTS

| | | |
|---|---|---|
| 3,906,919 | 9/1975 | Asik et al. . |
| 3,942,102 | 3/1976 | Kuhn et al. . |
| 3,961,240 | 7/1976 | Pohl . |
| 4,004,213 | 1/1977 | Kato et al. . |
| 4,005,356 | 1/1977 | Trussell . |
| 4,006,403 | 2/1977 | Olsen et al. . |
| 4,020,413 | 4/1977 | Wetherbee . |
| 4,032,842 | 6/1977 | Green et al. . |
| 4,080,589 | 3/1978 | Kline . |
| 4,152,655 | 5/1979 | Przybyla et al. . |
| 4,167,767 | 9/1979 | Courier de Mere . |
| 4,209,779 | 6/1980 | Beck et al. . |
| 4,285,321 | 8/1981 | Phelon et al. . |
| 4,337,515 | 7/1982 | Kreft . |
| 4,353,091 | 10/1982 | Hoppe . |
| 4,379,263 | 4/1983 | Everett et al. . |
| 4,394,742 | 7/1983 | Crummer et al. . |
| 4,401,948 | 8/1983 | Miura et al. . |
| 4,449,100 | 5/1984 | Johnson et al. . |
| 4,454,560 | 6/1984 | Nakao et al. . |
| 4,547,734 | 10/1985 | Spaude . |
| 4,558,280 | 12/1985 | Koehl et al. . |
| 4,613,797 | 9/1986 | Eggers et al. . |
| 4,628,269 | 12/1986 | Hunninghaus et al. . |
| 4,636,777 | 1/1987 | Skerritt .................................. 73/118.1 |
| 4,639,676 | 1/1987 | Kawai et al. . |
| 4,661,778 | 4/1987 | Anderson . |
| 4,684,896 | 8/1987 | Weishaupt . |
| 4,696,280 | 9/1987 | Niggemeyer . |
| 4,758,790 | 7/1988 | Hunt . |
| 4,760,341 | 7/1988 | Skerritt . |
| 4,783,991 | 11/1988 | Wixon . |
| 4,825,167 | 4/1989 | Bayba . |
| 4,831,564 | 5/1989 | Suga . |
| 4,839,772 | 6/1989 | Choi et al. . |
| 4,841,925 | 6/1989 | Ward . |
| 4,918,389 | 4/1990 | Schleupen et al. . |
| 4,983,886 | 1/1991 | Balland . |
| 5,001,432 | 3/1991 | Wixon . |
| 5,017,874 | 5/1991 | Di Nunzio et al. . |
| 5,027,073 | 6/1991 | Kaller et al. . |
| 5,032,969 | 7/1991 | Eggers et al. . |
| 5,046,470 | 9/1991 | Entenmann et al. . |
| 5,065,073 | 11/1991 | Frus . |

OTHER PUBLICATIONS

The Illustrated Dictionary of Electronics (5th Ed.), Rufus P. Turner, Stan Gibilisco, 1990, pp. 671, 672 (month unavailable).

Lucas Aerospace Overhaul Manual, Type NB.10605, No. 10705 High Energy Ignition Unit (May, 1974), FIG. 2.

Standard Handbook for Electrical Engineers, A. E. Knowlton McGraw–Hill, 1957, pp. 1845–1846. (month unavailable).

J. G. Tracy, B. H. Bailey "Ferrites Simpify Snubber Design for a Traction Chopper Utilizing Series Thyristors" IAS/IEEE Tenth Annual Mtg. ., Sep. 1975, PG. 10.026, pp. 25–29. (month unavailable).

How Things Work, translaton © George Allen & Unwin Ltd. (1967) pp. 580–581. (month unavailable).

Transactions of AIEE 1958 Applications of Nonlinear Magnetics (month unavailable).

Conference on Power Applications of Controllable Semiconductor Devices, 1965 (month unavailable).

Crouse, "Automative Electrical Equipment", *Webster Division McGraw–Hill Book Company*, 6th Edition, 1942. (month unavailable).

Frazee, "Automotive Fuel and Ignition Systems", *The Technical Press Ltd.*, 1953 (month unavailable).

Burland, "High Energy Igniters", *Aerospace*, (Jan. 1984).

Scroggie, "Clip Around Meters", *Radio of Electronic Laboratory Handbook*, 8th Edition (1971). (month unavailable).

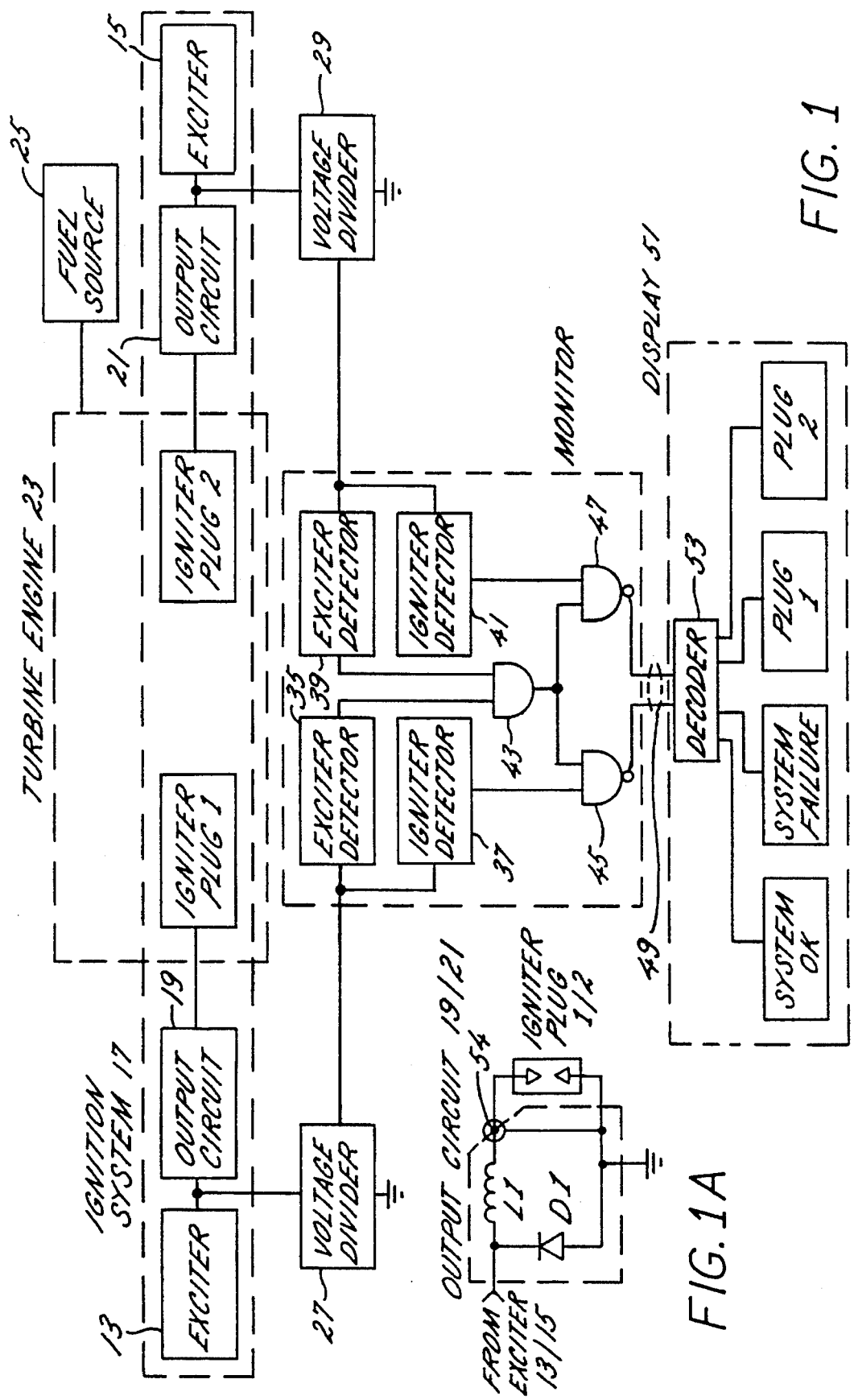

DIAGNOSTIC DEVICE FOR GAS TURBINE IGNITION SYSTEM

This is a divisional of applications(s) Ser. No. 08/271,519 filed on Jul. 7, 1994, pending, which is a divisional of Ser. No. 07/958,644, filed on Oct. 7, 1992 (now U.S. Pat. No. 5,343,154), which is a continuation of U.S. Ser. No. 07/557,973 filed on Jul. 26, 1990 (now U.S. Pat. No. 5,155,437).

TECHNICAL FIELD

The invention generally relates to ignition systems for gas turbine engines and, more particularly, to monitoring and diagnostic devices for such systems.

BACKGROUND OF THE INVENTION

The monitoring of ignition systems for gas turbine engines is of particular interest because such systems are of critical importance to the safe operation of aircraft incorporating these types of engines. By monitoring the performance of ignition systems in gas turbine engines, an indication that the system is malfunctioning can be obtained. By providing an indication of a malfunctioning ignition system, a measure of safety is obtained that can be of particular importance in ensuring the ignition system is capable of restarting an engine after a flameout has occurred, or to initiate a maintenance cycle prior to the next flight.

In monitoring ignition systems of gas turbine engines, the state of health of the igniter plug has in the past been the focus since the igniter plug is the component of the ignition system with the shortest average useful life. Failure or malfunctioning of other components of the ignition system, however, may occur and the typical monitoring system fails to identify failures or malfunctioning of these other components. Indeed, some monitoring devices may actually falsely indicate a properly operating ignition system when the system is in fact malfunctioning or failing, others may indicate a failure when none exists causing unnecessary maintenance.

An ignition sequence is typically initiated by a narrow high voltage pulse generated by an exciter circuit. For a successful ignition, the high voltage pulse is discharged at the igniter plug, thereby generating a spark. There have been attempts to analyze the voltage pulse from the exciter and the following voltage waveform generated by the spark in order to diagnose the health of an ignition system. In the past, however, such monitoring systems could only provide an indication of the health of the igniter plug and failed to monitor or diagnose the state of health of other components of the ignition system that may lead to failure of the igniter plug.

For example, U.S. Pat. No. 4,760,341 to Skerritt discloses a monitoring device that senses the electric field generated by a signal at the input to the igniter plug of an ignition system. The monitoring device receives the signal generated by the electric field and detects if the input signal to the plug is maintained longer than a predetermined time period and above a predetermined voltage level. If the input signal is maintained longer than the predetermined time period, the device indicates the plug is deteriorating. If the voltage of the input signal fails to reach the predetermined level, however, the monitor of the Skerritt patent also interprets this failure as a deteriorating plug when in fact the exciter may be degraded and the igniter is functioning properly.

In addition to measuring the width of the high voltage pulse, the monitoring device in the Skerritt patent also measures the energy discharged through the plug during the spark event. If the total energy delivered in the spark event signal is satisfactory and the signal to the plug is not too long, the monitoring device provides a pulse output, indicating that the igniter plug is operating properly.

Although measurement of the total energy delivered to the plug in response to the high energy pulse is a useful complement to the measurement of pulse duration, the two measurements fail to provide the user with anything other than a general indication that the ignition system is malfunctioning. More specifically, the measurements of the Skerritt monitoring device do not distinguish between a failing device for discharging the high energy pulse (i.e., the igniter plug) and a failing device for generating the high energy pulse (i.e., the exciter).

SUMMARY OF THE INVENTION

It is the primary object of the invention to monitor the health of each of the igniter plug and the exciter circuit in an ignition system by detecting abnormal conditions in the waveforms of the system associated with a spark event.

It is also an important object of the invention to detect malfunctioning of the igniter plug at a location within the ignition system that is isolated from the extreme environment of the igniter plug and is implemented without the need of an expensive sensor coupling to the igniter plug or its input leads; but rather by sensing perturbations in the waveforms of existing signals. In this connection, it is also an object of the invention to monitor the state of health of the igniter plug at a location within the ignition system that is remote from the plug itself so that the monitoring device can be effectively incorporated into the same apparatus as the exciter circuitry and totally isolated from the extreme environment of the igniter plug.

It is a related object of the invention that no additional wires or connectors are required on the downstream side of the exciter in order to accomplish the diagnostic monitoring.

It is yet another important object of the invention to diagnose the state of health of the ignition system by distinguishing between the failure of the plug and the failure of the exciter circuit. In this regard, it is a related object of the invention to prevent false diagnosis of the state of health of the igniter by requiring the exciter to be diagnosed as healthy before the igniter is diagnosed as failed.

It is another important object of the invention to accurately monitor the health of both the igniter plug and the exciter circuit for an ignition system by distinguishing between actual failure of the plug or exciter circuit and the occasional irregularities in the high energy pulse that may occur as a result of normal operation in the severe environment of a turbine engine.

It is another important object of the invention to provide an indication of the impending failure of an igniter plug in an ignition system so as to provide an opportunity for initiating preventive maintenance, It is still another object of the invention to minimize the number of leads required to communicate to a remote location the diagnostic information derived from the monitoring of the ignition plug and exciter circuit.

It is another object of the invention to provide a monitoring system for an ignition system that is easily adapted as a transportable automatic test equipment (ATE) separate from the turbine engine and its ignition system.

Other objects and advantages will become apparent with reference to the following detailed description when taken in conjunction with the drawings.

The invention achieves the foregoing objects by providing a monitoring device for an ignition system of a gas turbine engine that comprises an exciter detector and an igniter detector, each monitoring characteristics of high energy pulses delivered from an exciter to an output circuit of the ignition system for generating a spark at an igniter plug. In response to the monitoring of the high energy pulses, the exciter detector provides an indication of the exciter's state of health and the igniter detector provides an indication of the igniter plug's state of health.

In the exciter detector, the voltage levels of the high energy pulses are monitored to determine whether they are persistently less than a predetermined value representing a nominal minimum voltage generated by the exciter when healthy. In the igniter detector, the rate of discharge for the high energy pulses from the exciter into an output circuit of the ignition system is monitored to determine whether the rate of discharge is persistently less than a predetermined rate representing a nominal minimum rate of discharge for a healthy igniter plug.

In order for the monitoring device to sense the high energy signals from the exciter, a high impedance voltage divider network connects the output of the exciter to ground. A signal from a node of the voltage divider provides the input signal for each of the exciter and igniter detectors. For purposes of economy, a safety resistor, typically present at the output of the exciter, may be incorporated into the voltage divider.

The exciter and igniter detectors are responsive to the high energy pulses generated by the exciter and the discharging of the high energy pulses into the output circuit. In a properly operating ignition system, a healthy exciter produces high energy pulses of at least a predetermined minimum voltage. For a healthy igniter plug, the output circuit stores the high energy pulse into an inductor and quickly discharges the energy of the pulse as a spark at the igniter plug. If the igniter plug fails to spark, the input to the output circuit appears as a virtual open circuit to the high energy pulses and the pulses discharge through the voltage divider network. The rate of discharge for the high energy pulses through the voltage divider network is much less than the rate of discharge for the pulses through the igniter plug. Therefore, the ignition detector monitors the rate of discharge of the high energy pulses and determines from that rate the igniter plugs state of health.

To prevent the false indication of a failed igniter plug as a result of the upstream failure of the exciter, the response times of the exciter and igniter detectors are such that the exciter detector response is significantly faster than the igniter detector. A diagnostic output circuit responsive to the exciter and igniter detector provides the user of the monitoring device with an indication of the state of health of the ignition system and ensures against a false indication of a failed igniter plug by ignoring an indication of a failed igniter plug if the exciter detector is also providing an indication of a failed exciter.

The monitoring device of the invention may be used to monitor a single channel of an ignition system—i.e., an exciter and associated output circuit and igniter plug. Alternatively, the monitoring device may be used in connection with an ignition system comprising multiple channels. For a multiple channel ignition system, the monitoring device includes exciter and igniter detectors for each channel. In order to minimize the cabling necessary to communicate the diagnostic signals of the monitoring device to a display in a multi-channel system, the signals from the various exciter and igniter detectors are first encoded and then communicated to a remote display via a thin cable. At the remote display, the signals are decoded and the state of health of the ignition system is indicated to a user.

In an alternative embodiment, the diagnostic system of the invention may be placed in a stand alone automatic test equipment (ATE) environment so that it can be incorporated into a structured maintenance routine. The ATE may include an exciter and output circuit in order to deliver the same type of high energy pulses provided an igniter plug by the ignition system. A technician or other maintenance personnel disconnects the igniter plug from the ignition system either by physically removing the plug or disconnecting the plug at its cable connection to the output circuit of the ignition system. Once disconnected, the igniter plug can be connected to receive high energy pulses from the exciter and output circuit associated with the ATE apparatus and the monitoring device will report to the maintenance personnel the state of health of the igniter plug.

In addition to detecting persistent failure of the exciter and igniter plug of a channel, the monitoring device may also detect the intermittent failure of either the exciter or igniter plug and report a diagnosis and response thereto.

BRIEF DESCRIPTION OF THE DRAWINGS

FIG. 1 is a block diagram of the monitor of the invention in its intended environment of an ignition system in a turbine engine;

FIG. 1A is a schematic diagram of an exemplary output circuit for the ignition system of FIG. 1;

FIG. 2A illustrates an exemplary waveform associated with a healthy igniter and FIG. 2B illustrates an exemplary waveform associated with a failed igniter;

Figure 2A:
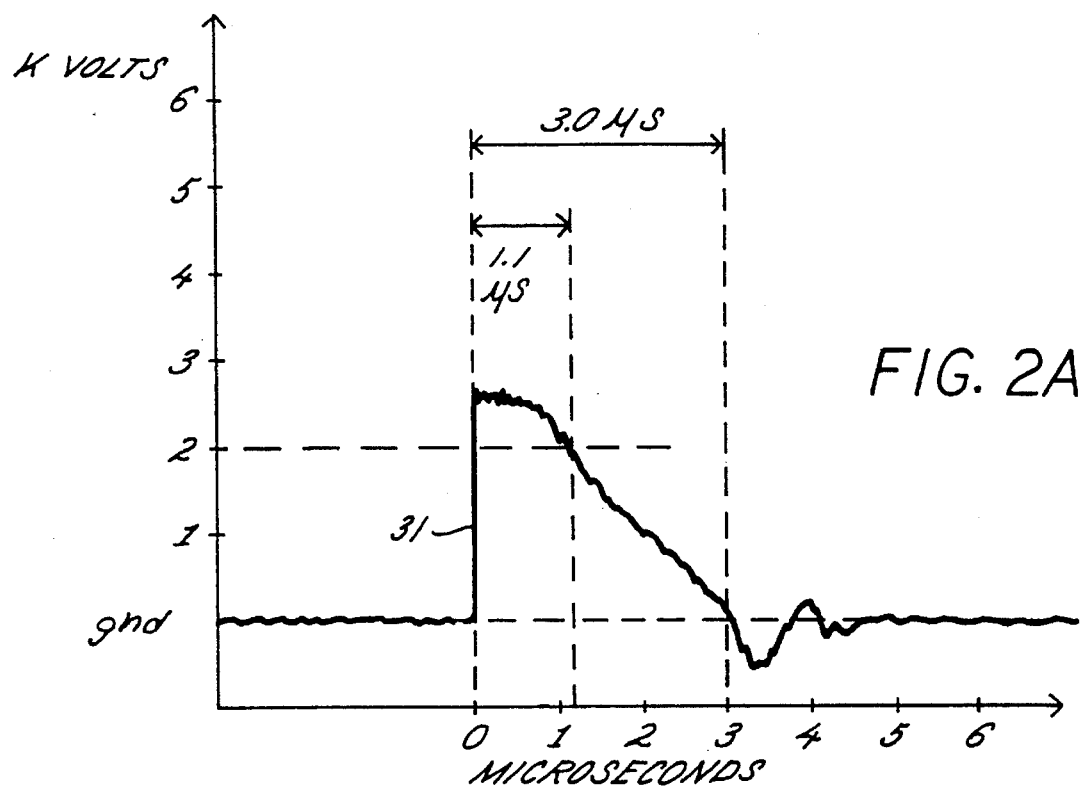
FIGS. 2A–2B are exemplary voltage waveforms for a high energy pulse delivered to an igniter plug by an exciter circuit in the ignition system of FIG. 1, where

While the invention will be described in some detail with reference to a preferred embodiment and an alternative embodiment illustrated in the drawings, it is to be understood that this description is not intended to limit the scope of the invention. On the contrary, applicant intends the scope of the invention to cover all alternatives, modifications and equivalents that fall within the spirit and scope of the appended claims.

DETAILED DESCRIPTION OF THE PREFERRED EMBODIMENT

Turning to the drawings and referring first to FIGURE 1, a monitoring device 11 according to the invention is responsive to a series of voltage signals derived from a corresponding series of high energy pulses provided at the output of each of a pair of exciters 13 and 15 of an ignition system 17 for use by a pair of output circuits 19 and 21 and igniter plugs 1 and 2 to generate sparks. Each one of the pairs is commonly referred to as a channel. Although the ignition system 17 as illustrated in FIG. 1 includes two channels, it will be appreciated that the ignition system may include only one channel or alternatively a plurality of channels.

As is well known in the art, each of the exciters 13 and 15 and output circuits 19 and 21 is typically located externally from the turbine engine 23, whereas each of the igniter plugs 1 and 2 is of course located within a combustion chamber of a turbine engine 23 as suggested by FIG. 1. A fuel source 25 provides fuel to the combustion chamber within the engine 23 where it is ignited by sparks generated by each of the igniter plugs 1 and 2. The two channels of an exciter, output circuit and igniter plug is a typical installation in a turbine engine used in aircraft since it provides a redundancy that protects against failure of the ignition system in flight. Because the two channels of an exciter, output circuit and igniter plug are redundant, those skilled in the art of ignition systems for gas turbine engines will appreciate that the following description with reference to one channel of the exciter 13, output circuit 19 and plug 1 applies equally well to the other channel of exciter 15 and igniter circuit 21.

Each of the output circuits 19 and 21 comprises a unipolarity diode D1, an output inductor L1 and a high voltage output connector 54 as illustrated in FIG. 1A. The output connector 54 is a conventional high voltage coupling that is useful in connection with an alternative application of the invention. Specifically, a monitoring device like the monitoring device 11 of FIG. 1 may be incorporated into automatic test equipment (ATE) that reproduces the function of the ignition system 17 so as to provide high energy ignition pulses to either of the igniter plugs 1 or 2. The state of health of each igniter plug 1 and 2 may be checked by a technician at any time merely by disconnecting the plug from the ignition system and connecting it to an output of the ATE that provides calibrated high energy pulses. The monitoring device internal to the ATE functions the same as the monitoring device 11 and provides the technician with a means to quickly check the ignition system to ensure it is functioning properly. Although not as convenient as disconnecting the igniter plug at the high voltage connector, the ATE apparatus may alternatively incorporate a socket for receiving igniter plugs such that the technician physically removes the plug from the ignition system and places it in the ATE for testing its state of health.

As can be appreciate from FIG. 1A, each of the output circuits 19 and 21 provides for unipolar discharging of the high energy pulses from the exciters 13 and 15. The invention may also be used in connection with a bipolar discharge, however, and in this regard the unipolar configuration of FIG. 1A is only illustrative. In either bipolar or unipolar output circuits, the ignition event may be divided into two discharge events. The first discharge event occurs when a storage capacitor (not shown) of the exciter 13 or 15 discharges a high energy pulse into the output circuit. The second discharge event occurs when the inductor L1 stores the energy from the pulse and discharges it through the igniter plug and diode D1.

When the igniter plug 1 fails, it typically fails such that the output circuit 19 appears as an open circuit with respect to the exciter 13. In order to dissipate the high energy pulse from the output of the exciter 13 when the igniter plug 1 fails, a resistor is commonly employed to shunt the pulse to ground. Such resistors are often called "safety" resistors. The safety resistors typically each have a value of 1k to 10k Ohms. When the igniter plug 1 fires, the impedance of the arc is very small (i.e. usually measured in milliohms), approaching a short circuit, and the discharge of the exciter 13 is very rapid because the time constant of the output circuit 19 is short. If the igniter plug 1 fails to fire (an arc fails to form due to insufficient ionization), then the impedance of the output circuit 19 remains very large, approaching an open circuit, and the discharge of the exciter 13 must seek an alternative path that is provided by the safety resistor. Because the safety resistor has a high resistance value relative to the low resistance at the gap of the igniter plug 1 when a spark is generated, the rate of discharge of the exciter 13 through the resistor is long compared to the rate of discharge when a healthy spark has been generated.

Figure 2B:
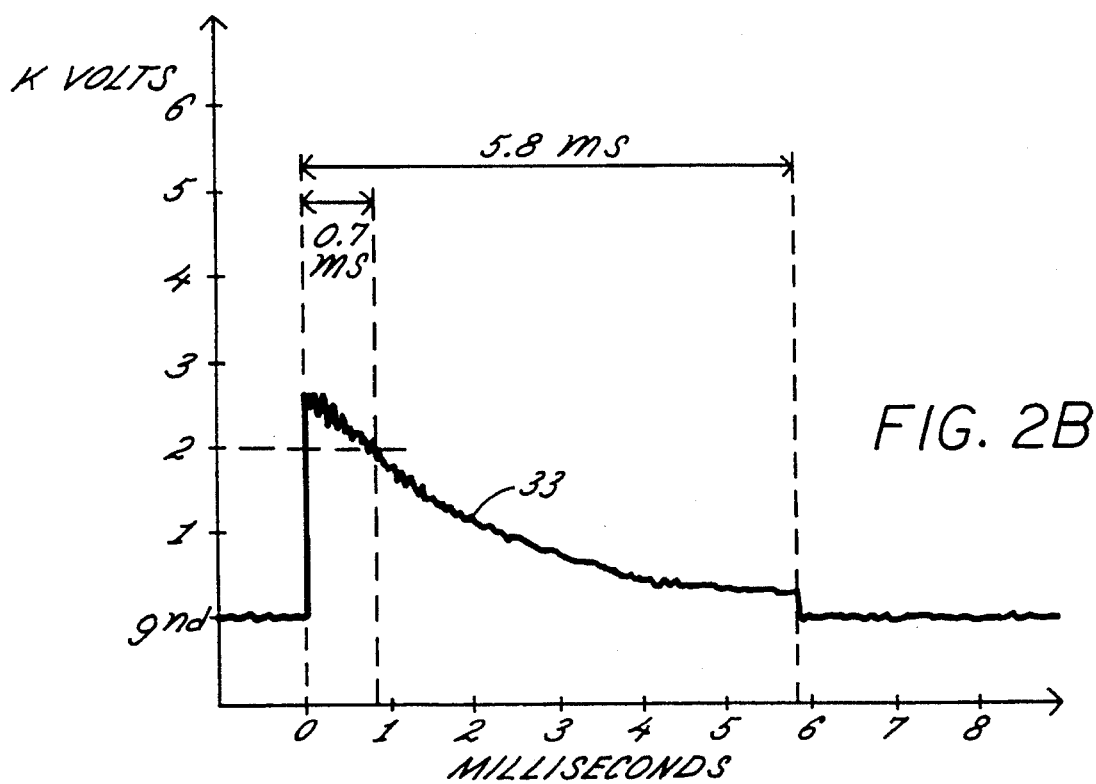

Referring briefly to the exemplary discharge waveforms of FIGS. 2a and 2b, a healthy ignition system 17 discharges the high energy pulse from the exciter 13 into the output circuit 19 in approximately three (3) microseconds as indicated by the waveform 31 in FIG. 2a. The normal output of the exciter 13 is a narrow high voltage pulse occurring at a regular interval (i.e., 3 microseconds, 2500 volts, once per second). Repeated high energy pulses are typically automatically generated by the exciter 13 in order to provide a series of ignition sparks that protect against a flameout of the engine 23 during critical times such as landing and takeoff of the associated aircraft where a manual initiation of an ignition to restart the engine cannot be safely done.

It will be appreciated by those skilled in ignition systems for gas turbine engines that the waveform 31 is only the initial portion of the full waveform for an entire discharge event, which is typically 150 microseconds long. When the waveform 31 crosses a reference ground for the exciter 13 and output circuit 19, the exciter has fully discharged into the inductor L1 of the output circuit. In FIG. 2a, the waveform 31 crosses the reference ground at a time 3.0 microseconds after the high energy pulse from the exciter 13 is initiated. After the exciter 13 has fully discharged into the output circuit 19, the waveform 31 thereafter represents the signal appearing at the output of the exciter generated by the discharging of the energy from the output circuit through the igniter plug 1 so as to create a spark. As used hereinafter, the term "discharge event" refers to the discharging of the high energy pulse from each of the exciters 13 and 15 into the associated output circuits 19 and 21, respectively.

In contrast to the relatively fast discharge event of a high energy pulse in a healthy system, a discharge event through the safety resistor occurs in approximately 5.8 milliseconds as suggested by the exemplary waveform 33 of FIG. 2b. Because of this virtually three orders of magnitude difference in the discharge rates between a healthy discharge event and a failed discharge event, the discharge waveform can be used to monitor the health of the ignition system 17. Although the dramatic difference in discharge rates between a healthy discharge of the exciter 13 and a failed discharge may be used to monitor the performance of the ignition system 17, it cannot distinguish between a failure of the igniter plug 1 and a failure of the exciter 13; yet, failure of either component can cause the system 17 to fail to generate a spark and instead dissipate the high energy pulse through the safety resistor 27.

In accordance with one important aspect of the invention, the monitoring device 11 derives a low voltage signal from the output of each of the exciters 13 and 15 and provides an indication of the state of health for each of the igniter plugs 1 and 2 as distinguished from the state of health of the exciters 13 and 15 such that a failed discharge event can be diagnosed as resulting from either a malfunctioning plug that needs replacing or a malfunctioning exciter that requires servicing. The low voltage signals derived from the outputs of the exciters 13 and 15 duplicate the waveform at the inputs of associated output circuits 19 and 21, respectively. If the low voltage pulses indicate that the pulses generated by the exciter 13 or 15 persistently exceed a predetermined voltage value, then there is a high probability that the pulses from the exciters are capable of creating a spark at the igniter plugs 1 and 2. If failed discharge events such as illustrated in FIG. 2b are persistently detected while either of the exciters 13 or is persistently providing voltage pulses exceeding the predetermined voltage value, the monitoring device 11 will provide an indication that the associated plug has failed. On the other hand, if the exciter is not persistently providing voltage pulses exceeding the predetermined voltage value, the monitoring device will indicate the exciter has failed, and disallow an indication of a failed igniter plug.

Like the ignition system 17, the monitoring device 11 comprises two channels, each channel receiving an output from a voltage divider network 27 or 29 connecting the output of each exciter 13 or 15 to ground. For purposes of economy, it is desirable to incorporate the safety resistor into the voltage divider, although it is not necessary. The first channel of the monitoring system 11 is associated with one of the two channels of the ignition system 17 and comprises an exciter detector 35 and an igniter detector 37 connected in parallel so that each receives the series of low voltage signals from the voltage divider 27. Similarly, the second channel of the monitoring system 11 is associated with a second of the two channels of the ignition system 17 and comprises exciter detector 39 and an igniter detector 41 connected in parallel so that each receives the series of low voltage signals from the voltage divider 29. Each of the exciter detectors 35 and 39 monitors the series of high voltage pulses delivered to the output circuit 19 or 21 by way of the series of low voltage pulses from the voltage divider 27 or 29 and detects persistent voltage levels for the high energy pulses that are less than a predetermined value representing a nominal minimum voltage generated by exciter 13 when it is healthy. Each of the igniter detectors 37 and 41 also monitors the high voltage pulses by way of the low voltage pulses from the voltage divider 27 or 29 and detects persistent discharging of the high energy pulses at a rate much less than a predetermined rate representing a nominal minimum rate of discharging for the exciters 13 and 15.

When either of the exciter detectors 35 and 39 detects that the high energy pulses are persistently failing to rise above the predetermined nominal minimum voltage, its output is asserted. The outputs of the two exciter detectors 35 and 39 provide the inputs for a AND gate 43. The active states of the outputs from the exciter detectors 35 and 39 are low or a logic zero state so that failure of either exciter 13 or 15 results in the output of the AND gate 43 assuming a logic zero state. The predetermined nominal minimum voltage used as a reference by each of the exciter detectors 35 and 39 corresponds to a minimum voltage that assures ionization of the spark gap of a healthy output circuit 19 or 21.

The AND gate 43 provides its output to the inputs of two NAND gates 45 and 47. Together, the AND gate 43 and NAND gates 45 and 47 encode the state-of-health signals from the exciter detectors 35 and 39 and the igniter detectors 37 and 41 to provide a two-wire output 49 that can be easily extended as a thin cable for remotely locating a system status display 51. At the remote location of the display 51, a decoder 53 decodes the two-bit signal so that the display may indicate the state-of-health of each igniter plug 1 and 2 (i.e., "PLUG 1" and "PLUG 2" on the display) and the state of exciters 13 and ("SYSTEM OK" or "SYSTEM FAILURE" on the display).

When either of the igniter detectors 37 and 41 detects failure to spark at one of the igniter plugs 1 and 2, it asserts its output to a state of an active logic zero (the same as the exciter detectors), which provides a second input to one of the NAND gates 45 or 47. The encoding provided by the three gates 43, 45 and 47 is as follows:

| State of Health | Outputs | |
|---|---|---|
| | Gate 45 | Gate 47 |
| "SYSTEM OK" | 0 | 0 |
| "PLUG 1" (Igniter plug 1 failed) | 1 | 0 |
| "PLUG 2" (Igniter plug 2 failed) | 0 | 1 |
| "SYSTEM FAILURE" | 1 | 1 |

The outputs from the monitoring device 11 cooperates with the decoder 53 to provide a diagnostic output that indicates to either maintenance personnel, the engine control unit apparatus, or the user of the engine 23 (e.g., a pilot) the state-of-health of the ignition system and, most importantly, the source of a problem if one exists.

Figure 3:
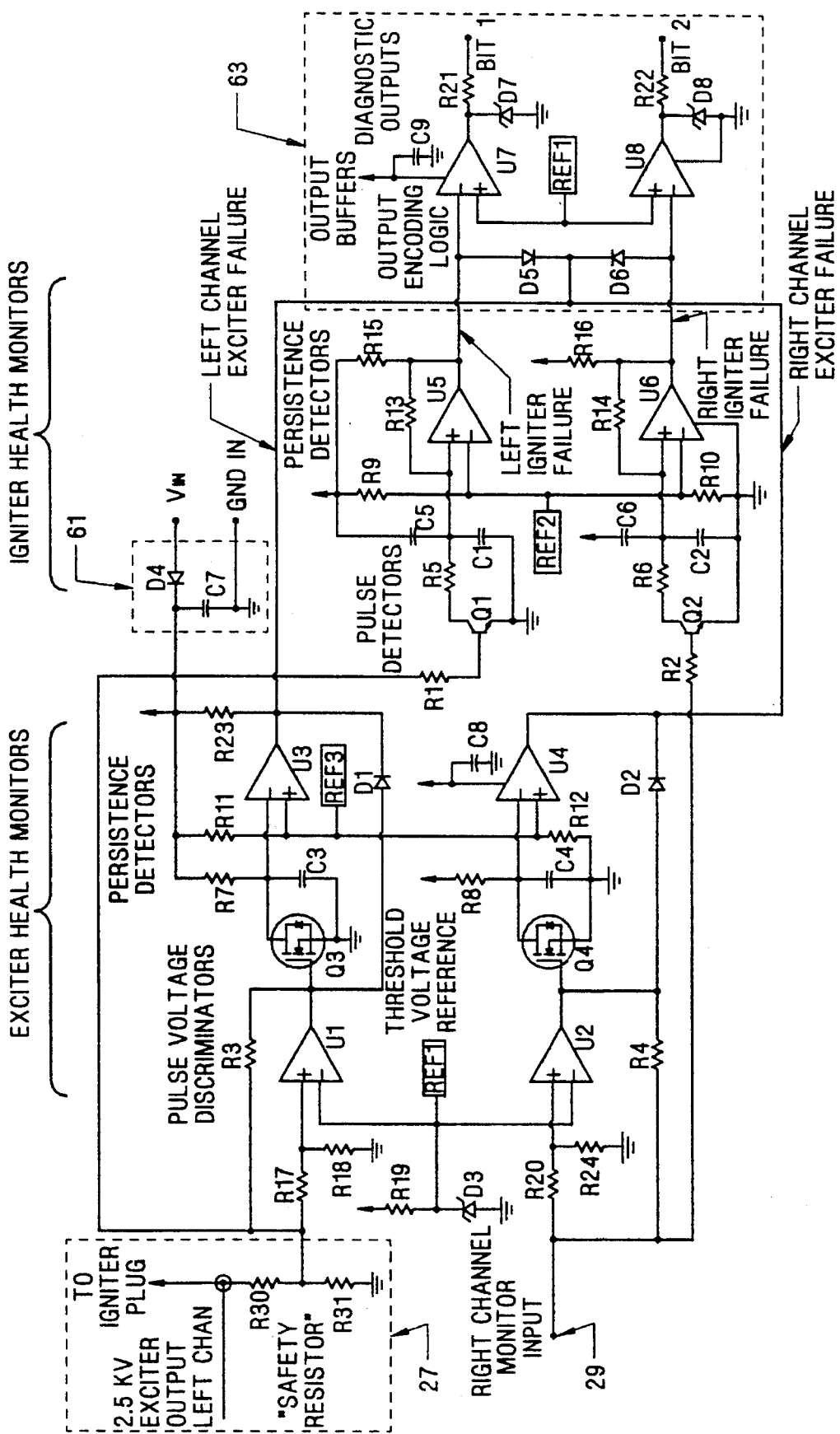
FIG. 3 is a schematic diagram of the monitor of FIG. 1 implemented in an analog manner and in accordance with a preferred embodiment.

FIG. 3 illustrates an analog implementation of the monitoring device 11 in FIG. 1 according to a preferred embodiment. As with the description given in connection with FIG. 1, only one of the two channels in the monitoring device of FIG. 3 will be described in detail since the second channel of the device is a functional duplication of the first, except the first channel is with reference to a first channel of the ignition system and the second channel is with reference to a second channel of the ignition system.

When the ignition system 17 (FIG. 1) is initially connected to a DC power source Vin, it immediately begins producing sparks. At the same time power is applied to the ignition system 17, it is also applied to the monitoring device in FIG. 3 via a power supply filter 61. A small current flows from the DC power source Vin through diode D4, which prevents damage if reverse polarity power is inadvertently applied. The current charges capacitor C7, which provides smooth and noise free power to the logic. The DC voltage biases integrated circuits U1 through U8, establishes the reference voltages REF1, REF2, and REF3, and establishes an initial condition (charge) on capacitor divider networks C1, C5 and C2, C6.

Turning first to the detection of a failed exciter, the diagnostic logic monitors the high voltage discharge at the output of the exciter 13 where it enters the output circuit 19 going to the igniter plug 1. Safety resistor R30 and resistor R31 form the voltage divider network 27 shown in FIG. 1. The signal at the node between the two resistors R30 and R31 is an attenuated duplicate of the output pulse from the exciter 13, and it is further attenuated by the voltage divider consisting of R17, R18 before being applied to the monitoring device at the input of a voltage comparator U1.

The output of comparator U1 will transition from a low to a high level whenever the voltage at its non-inverting (+) input exceeds the voltage at its inverting (−) input, which is connected to a threshold reference voltage REF1. A small current flowing through resistor R19 into zener diode D3 provides a stable voltage for the reference voltage REF1 (i.e., 6.2 volts). The ratio of resistors R17, R18 is adjusted so that the (+) input of comparator U1 equals the reference voltage REF1 when the output of the exciter 13 reaches a fixed percentage of its expected output (e.g., 2000 volts as indicated in the exemplary waveforms of FIGS. 2a and 2b, which is 80% of a pulse normal 2500 volts). Thus, each time the exciter 13 provides a pulse to the output circuit 19 that is at least 2000 volts, a pulse is created at the output of comparator U1.

Resistor R3 is a pull-up resistor that is only effective when the pulse from the exciter 13 is sensed across resistor R31, but that is the only time that the output of comparator U1 could be high. Furthermore, the amplitude of the pulse across the monitoring resistor R31 is consistently approximately 12 vdc, whereas if the pull-up resistor R3 was returned to Vin which varies from about 10 vdc to 30 vdc, then additional circuitry would be required to protect the gate of the MOSFET Q3.

In order to detect failure of the exciter 13, the output pulses from the comparator U1 are applied to the input of a persistence detector consisting of MOSFET Q3, an integrator circuit composed of resistor R7 and capacitor C3, and a comparator U3. Proper operation of the exciter 13 periodically causes a pulse that turns on MOSFET Q3, which in turn resets the integrator circuit. MOSFET Q3 is a fast switching device so that even very short pulses derived from the waveform of a healthy ignition will be sufficient to discharge capacitor C3 by turning on MOSFET Q3. Thus capacitor C3 will not charge to a very high level before being reset by the next pulse when the waveform is consistently one of a healthy ignition event.

When a malfunction occurs and the exciter 13 ceases to deliver output pulses or delivers substandard output that is recognized by the pulse voltage discriminator, then MOSFET Q3 is no longer triggered and the capacitor C3 of the integrator circuit begins to accumulate a charge. Eventually, the voltage on the capacitor C3 will equal the threshold reference voltage REF3 set by voltage divider network of resistors R11 and R12, and the output of comparator U3 will be forced low, indicating a failure of the exciter 13. Resistor R23 is a pull-up resistor that normally keeps the output of comparator U3 high and maintains a reverse bias on latching diode D1. If sufficient time passes between pulses to the base of MOSFET Q3, the output of comparator U3 switches low, diode D1 becomes forward biased and the gate of MOSFET Q3 is pinned low so that the persistence detector cannot after which be reset. Thus, the output of the comparator U3 will be latched in the low state, indicating failure of the exciter 13. If the diode D1 is omitted, then the circuit will recover upon resumption of standard output pulses by the exciter 13, and the failure indication will be removed. In some applications, resetting the failure indication upon resumption of healthy output pulses may be a preferred operating mode, so the use of diode D1 may be considered optional.

As illustrated in FIG. 3, the monitoring device thus far described for the exciter 13 is duplicated for the exciter 15. In this regard, the exciter detector for monitoring exciter 15 comprises voltage divider network R20, R24, comparator U2, and pull-up resistor R4, whereas the persistence detector comprises MOSFET Q4, integrator circuit R8, C4, comparator U2 and diode D2. Inasmuch as the exciter detector and persistence detector for the exciter 15 function in the same manner as the detectors for the exciter 13, a description of that function will not be repeated herein.

Although it is not fundamental to this invention, the two outputs of comparators U3 and U4 indicating left and right channel exciter failure are shown tied together in the preferred embodiment in FIG. 3. The resulting signal is a wired AND logic function—i.e., either channel going low to indicate a failure causes the combined output to go low. The definition of this signal is modified as the failure of either or both exciters 13 and 15.

Turning now to an explanation of the circuitry for detecting failure of the igniter plugs 1 and 2, and referring again to the left channel in FIG. 3, the monitor point at the junction of safety resistor R30 and resistor R31 is also connected to the input of an igniter health monitor circuit. Each pulse biases transistor Q1 through resistor R1 and causes it to turn on when the voltage exceeds the base emitter voltage of transistor Q1 (e.g., approximately 0.7 volts corresponding to 148 volts at the output of the exciter).

Before examining the effect of transistor Q1, it is necessary to define the initial condition of the circuit as represented by the voltage at the node of capacitive voltage divider comprising capacitors C5, C1. When DC power is first applied to the diagnostic circuitry, the two capacitors C5, C1 charge essentially instantaneously in inverse proportion to their values that are chosen so that the common node will have an initial voltage of about 75% of the supply voltage. It will be appreciated by those skilled in the art of circuit design that, aside from the acquisition of the initial value, the effect of capacitors C1, C5 is of a simple integrator, and they behave essentially the same as if a single capacitor with a value equal to the parallel combination of capacitors C1 and C5 were located in the position of capacitor C1.

The integrator formed by the capacitors C1, C5 is charged by a current originating at the DC power supply and flowing through the series connected resistors R15, R13 provided that the output of comparator U5 is high (i.e., off, since in the illustrated implementation of the invention the outputs of the comparators are all open-collector transistors with their emitters tied to ground). Furthermore, the integrator C1, C5 is discharged by shunting a current to ground via resistor R5 when transistor Q1 is turned on. In contrast to the "resetting" of the integrator R7, C3 in the exciter health monitor by MOSFET Q3, in the case of integrator C1, C5 the discharge is neither instantaneous nor complete but rather has a rate and duration set by the value of resistor R5 and the on-time of transistor Q1, respectively. Thus, very narrow pulses occurring at the output of the exciter 13 will cause negligible effect on the state of charge of the integrator C1, C5 because of the corresponding short on-time of transistor Q1.

During the interval between pulses (when transistor Q1 is off) the integrator C1, C5 will continue to charge toward the DC supply voltage Vin due to resistors R15, R13. The comparator U5 compares the value from the integrator C1, C5 with a threshold reference voltage REF2, which is a voltage created by a voltage divider comprising resistors R9 and R10 and which typically will have a value of about 20% of the DC supply voltage Vin.

If the igniter plug 1 fails to fire, the high voltage pulse from a tank capacitor (not shown) of the exciter 13 will seek an alternate discharge path through safety resistor R30 and resistor R31 to ground. The rate of discharge through these resistors is several orders of magnitude slower than if the pulse had discharged through the igniter circuit. The on-time of transistor Q1 will be long, thus significantly discharging the integrator C1, C5 so that its value approaches the threshold established by reference voltage REF2. After several consecutive misses (pulses where the igniter plug 1 fails to fire) the voltage at the integrator C1, C5 value will reach the reference voltage REF2 and will cause the output of comparator U5 to transition to a low state indicating that the igniter plug 1 has failed persistently. Although latching this condition is not fundamental to the invention, the implementation of FIG. 3 performs a latching function in that once the failure causes the output of comparator U5 to go low, the pull-up effect of resistors R15, R13 is reversed and becomes a pull-down (discharge) effect via resistor R13 to the output of comparator U5 which is now at ground potential. Subsequently, the voltage value at the integrator C1, C5 can only drift further toward ground, thereby ensuring that its voltage will stay below the reference voltage REF2 until DC power is removed.

The persistence detection in the igniter detector is important because there is typically a large variation in the spark-to-spark performance of an ignition system. The variation is caused by minor deviations in the output of the exciter, the age of the plug, and large deviations in performance of the igniter plug due to varying conditions in the combustion chamber of the turbine that effect ionization. An occasional miss in a sequence of normal sparking is not sufficient to judge a failed igniter. The integrator is set to partially recover (charge) in the normal interval between sparks; its charge must be less than the discharge caused by the miss, but enough so that only persistent (e.g., 8 out of 10) consecutive failures will discharge the exciter to the igniter failure threshold.

As with the components of the exciter detector 35 in FIG. 1, it will be seen in FIG. 3 that the components of the igniter detector 37 are duplicated for the right channel; with components resistors R2, R6, R14, R16, transistor Q2, capacitors C6, C2, and comparator U6 functionally replacing resistors R1, R5, R13, R15, transistor Q1, capacitor C5, C1 and comparator U5, respectively. The output of comparator U6 will thus indicate failure of the right igniter plug 2 in the same way that the output of comparator U5 indicated failure of the left igniter plug 1.

Fundamental to the operation of any diagnostic circuitry is the prevention of any false positive outputs (reporting a failure when there is not). In the preferred embodiment of FIG. 3, a false positive could occur if the igniter detector 37 reported a failed igniter when the actual cause of failure to spark was a degraded exciter output. Such a condition occurs when the output pulses from the exciter occur regularly but their peak voltages are below the threshold necessary to ionize the igniter gap to create a spark. When such a condition exists, the output of the igniter detector 37 would be invalid.

In keeping with the invention, in order to prevent false positive reports from the igniter detector 37, the preferred embodiment relies on detecting the degraded output of the exciter 13 sooner than the earliest possible detection of a failure of the igniter plug 1 and using the former to preclude reporting the latter. Although there are many possible circuit implementations that could accomplish this prioritized detection, the embodiment of FIG. 3 achieves priority control by setting the relative persistence requirements of the exciter detector 35 and igniter detector 37 so that the exciter detector will react faster (i.e., exciter failure that must persist for five (5) seconds versus igniter failure that must persist for ten (10) seconds).

The remaining block in FIG. 3 is the output circuit 63 consisting of output encoding logic and output line buffers. Inputs to the encoding logic are the four individual failure signals LEFT EXCITER, LEFT IGNITER, RIGHT EXCITER and RIGHT IGNITER. In some applications all of these signals may be useful, or conversely they may be combined into as few as one output indicating FAILURE but offering no additional information as to which one caused the report. The preferred embodiment combines these signals into two output bits, either of which can be ON (pulled low) or OFF (open circuit), allowing the system to report four possible states:

| | |
|---|---|
| SYSTEM NORMAL | ON/ON |
| LEFT IGNITER FAILURE | OFF/ON |
| RIGHT IGNITER FAILURE | ON/OFF |
| SYSTEM FAILURE | OFF/OFF (EITHER OR BOTH CHANNELS) |

The output of comparator U5 is normally high and when applied to the (−) input of comparator/buffer U7 will force its output low (ON). Upon failure of the left igniter the output of comparator U5 will go low forcing the output of comparator U7 high (OFF). Similarly, the output of comparator U6 can force the output of comparator U8 high (OFF) to report the failure of the right igniter.

Additionally, the comparators U7 and U8 are of a type which have open-collector outputs which are OFF (i.e. high, 1) when their power supply is interrupted; thus reporting a "SYSTEM FAILURE" because neither channel is capable of generating a spark, and the diagnostic circuitry has also lost its operating power.

The two exciter detectors of FIG. 3 have their outputs connected together at a node which also includes the cathodes of diodes D5 and D6. This arrangement performs a logical AND operation like gate 43 in FIG. 1 such that the node will be high if and only if the outputs of comparators U3 AND U4 are high (both exciter channels are operating). Either exciter detector output going low (failure indication) causes the node to go low which forward biases diodes D5 and D6 to pull the inputs of both comparators U7 and U8 low thus forcing their outputs to OFF/OFF and reporting an exciter failure. Once the SYSTEM (exciter) FAILURE occurs and the BIT1 and BIT2 outputs are in the OFF/OFF state, subsequent failure of either igniter plug 1 or 2 will not cause any change (other than to force an already OFF output to remain OFF). Thus reporting the SYSTEM FAILURE will also preclude reporting an igniter failure and the integrity of the diagnostic system is protected from a false positive. The choice of OFF/OFF for SYSTEM FAILURE also guarantees that loss of power to the exciter (and/or power to the diagnostic monitors) will cause a SYSTEM FAILURE indication.

The diagnostic outputs BIT1 and BIT2 normally exit the ignition system via a connector and are connected via a wiring harness to an information display unit or to the engine control unit (ECU). The final components (resistor R21, diode D7 and resistor R22, diode D8) are current limiting resistors and voltage clamping zener diodes that protect the diagnostic circuit from electrical transients which might enter the ignition system through these output lines.

Figure 4:
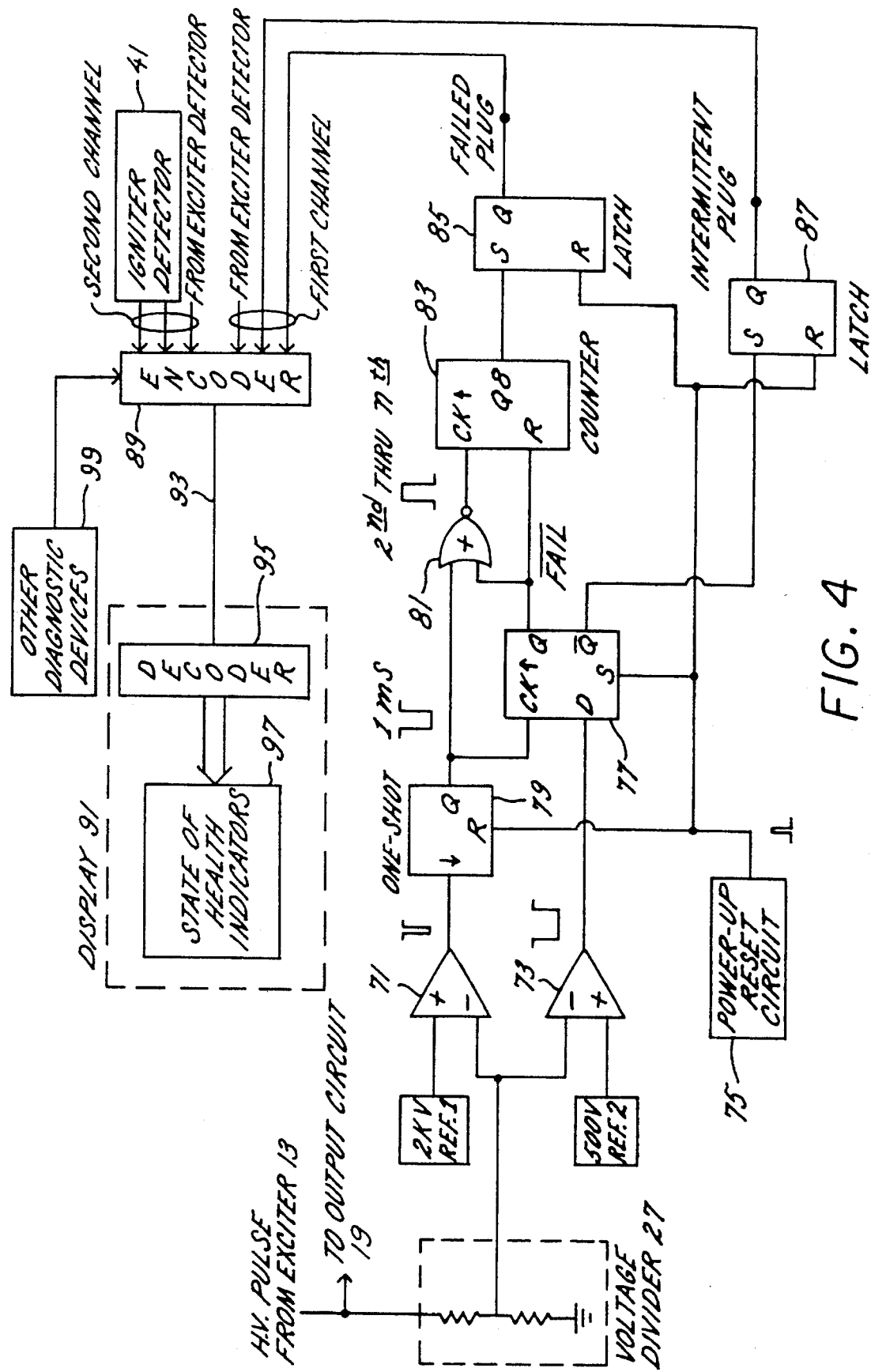
FIG. 4 is a schematic block diagram of a digital circuit for monitoring the state of health of the igniter plug in accordance with the invention such that both actual failure and impending failure of the plug may be diagnosed.

Turning now to an alternative embodiment of the invention illustrated in FIG. 4, several performance improvements can be achieved by a digital circuit implementation of the decision logic. The interface to the high voltage output of the ignition system uses the same voltage divider 27 as was already discussed with reference to FIGS. 1 and 3. The signal is then applied to the inputs of two level detectors 71 and 73. The first level detector 71 compares the exciter signal to a reference voltage REF1 that represents the minimum acceptable level which will be accepted as a valid exciter output. The output of detector 71 is a digital signal that will be low during the time that the exciter output is above REF1 (i.e., 2000 volts). The second level detector 73 compares the exciter signal to a reference voltage REF2 which is set at a low threshold so that the exciter signal will exceed it for virtually the entire discharge event. Therefore, the output of detector 73 is a digital signal which will be low during the time that the exciter output is above REF2 (i.e., 500 volts). To illustrate the significance of these two digital signals, they can be related to the energy of the tank capacitor of the exciter. Energy in a capacitor is:

$$E(\text{Joules}) = \frac{1}{2} C(\text{Farads}) * V^2(\text{Volts}^2)$$

At the beginning of the discharge event, both signals go low; at this time 100% of the energy remains in the tank capacitor. If REF1 is set at 80% of the nominal exciter output voltage (e.g., 2000 of 2500 volts) then the first signal from detector 71 will go high at the time when the tank capacitor has discharged to 2000 volts, and the remaining energy will be 64% of the initial energy, with 36% discharged during the time the first signal was low. The second signal from detector 73 will go high when the tank capacitor has discharged to reference voltage REF2 which is 20% of the initial voltage, and at that time only 4% of the initial energy remains in the capacitor. At the time the second signal goes high 96% of the energy has been discharged. Additionally, between the time the first signal went high and the time that the second signal went high 60% of the energy is discharged. In this sense, the rate of discharge is related to passing through two different voltage (charge) levels in a measured period of time.

In keeping with the invention, there is sufficient information in the individual and relative timing and duration of these two digital signals to diagnose the health of both the exciter and its igniter plug. The amount of diagnostic information that can be usefully extracted depends on the complexity of the decision making logic that processes the two signals.

The broadest implementation of this logic utilizes a microprocessor (not shown) that uses the signals from detectors 71 and 73 as two of its inputs. It may also incorporate additional inputs from other parts of the exciter that would allow a more detailed diagnosis to be performed. For example, the spark duration might be sensed via the current through inductor L1 (FIG. 1), or a thermocouple could detect overheating of circuit components, and provide the microprocessor with a warning of impending failure.

The microprocessor executes a program that implements decision algorithms in accordance with this invention in order to determine the state of health of both the exciter and its associated igniter plug. It can also control communication of the results to minimize the complexity of interconnection by using well known techniques like serial data transfer.

As an alternative to a microprocessor implementation of the diagnosis, the same results can be achieved with discrete digital logic (i.e., gates, counters, latches, etc.) as shown by the embodiment in FIG. 4. This circuit implements a single channel of a digital igniter detector in keeping with the invention. The primary improvement over the igniter detector of FIG. 3 is that the evaluation of whether the igniter plug fired or missed is done for each individual spark attempt (i.e., exciter output pulse). When DC power is first applied to the circuit of FIG. 4, a power-up reset circuit 75 generates a pulse to initialize the circuit that sets a flip-flop 77 so that its "Q" output is high, reporting a good igniter (in this case the first diagnosis of the health of the igniter plug has not been performed so it is presumed to be good). When the first discharge occurs there will be a pulse at the output of level detector 71 if, and only if, the pulse exceeds 2000 volts; thus if the exciter output is degraded and will not necessarily fire the igniter plug, no pulse will occur and no decision making process will be initiated. When a valid output occurs, the pulse from detector 71 triggers a one-shot timer 79, which produces a single pulse with a fixed duration (e.g., 1 millisecond). The trailing edge of this pulse clocks flip-flop 77, which samples its "D" input and latches that value into its "Q" output.

If a spark occurs, then the discharge will be completed much sooner than 1 millisecond, and the output of the second level detector 73 will be high at the end of the 1 ms delay. This signal, applied to the "D" input of flip-flop 77, causes the output of the flip-flop to be high (no change since it already is high), reporting a good spark.

If no spark occurs, then the discharge will be much longer than 1 millisecond because its rate depends on the safety resistor (R31 in FIG. 3). In this case, when the output of level detector 73 is sampled by flip-flop 77 after the delay created by one-shot 79 it will still be in a low state indicating that the discharge is still in progress. The output of flip-flop 77 will thus transition to a low state reporting a missed spark.

During normal operations, a NOR gate 81 blocks pulses from one-shot 79 because its other input from flip-flop 77 is high. After the first missed spark, the low output of flip-flop 77 allows the pulses through gate 81 and to the input of the missed-sparks counter 83. The counter output will have a binary value of zero because it was held reset by the output of flip-flop 77 prior to the first miss. If a second consecutive miss occurs then the counter 83 will increment to one. A third consecutive miss will increment it to two, and so on.

When the counter 83 reaches a count of eight, after the ninth miss, its Q8 output goes high which reports a failed igniter plug, having detected nine consecutive misses. Other implementations of a digital embodiment could require any integer number of misses as the definition of a failed igniter. The Q8 output sets latch 5, the output of which reports "FAILED PLUG"; this indication will remain until the next power interruption cycle.

If the failure of the igniter plug was only an intermittent condition and it recovers and a spark occurs at any time before the counter reaches eight, then the output of flip-flop 77 will return to the high state and will reset the counter to zero. No report will be made of a failed igniter because the nine-in-a-row requirement was not satisfied.

The intermittent sparking condition is still useful information, however, because it usually indicates that the plug may be nearing the end of its useful life and if the output of flip-flop 77 is monitored via another latch 87 then an additional diagnostic signal is available to report an "INTERMITTENT PLUG". A persistence counter could similarly be employed to only report "INTERMITTENT PLUG" if a certain ratio of intermittent misses was exceeded (e.g. any 5 misses out of a sequence of 10 sparks).

In a manner similar to that illustrated in FIG. 1, the outputs of latches 85 and 87 may be encoded by an encoder 89 of conventional design for communicating the diagnostic signals to a display 91 via a serial or parallel communications cable 93. At the end of the cable 93, the display 91 decodes the diagnostic signals in a decoder 95 and provides a user with an indication of the state of health of the system in keeping with the invention at indicators 97.

As indicated in FIG. 4, the diagnostic signals from additional ignition channels can be encoded in the encoder 89 for communicating to the display 91 via the cable 93. As illustrated in FIG. 1, a second channel may be incorporated into the ignition system. An ignition detector 95 for a second channel that is functionally identical to the illustrated igniter detector for the first channel provides "FAILED PLUG" and "INTERMITTENT PLUG" diagnostic signals to the encoder 89. Diagnostic signals from the exciter detectors for both channels are also provided as inputs to the encoder 89. Each of the exciter detectors may be a digital version of the analog-type exciter detectors illustrated in FIG. 3 or they may be the analog-type devices themselves. Finally, other diagnostic devices 97 associated with the ignition system may also be encoded and delivered to the display 91 via the cable 93. For example, a thermocouple may be one of the devices 97, which could be attached to a component of the ignition system to indicate an overheating condition indicative of the system's impending failure.

These methods can be extended by additional logic, or additional programming if a microprocessor is employed, to generate the exciter health outputs using the same signals from the level detectors.

I claim:

1. A method of monitoring an ignition system for igniting fuel, the ignition system comprising an exciter for generating a series of high energy pulses and delivering the pulses to an igniter plug for producing a series of sparks across a gap of the igniter plug to ignite the fuel, the method comprising the steps of:

(a) detecting voltage values for the high energy pulses in the series that are less than a value representing a nominal minimum voltage generated by the exciter when it is healthy;

(b) detecting discharge rates of the high energy pulses in the series that are much less than a rate representing a nominal minimum rate of discharge for the igniter plug when it is healthyl and (c) reporting a failure of the igniter plug only when steps (a) and (b) indicate the exciter is healthy and the igniter plug is malfunctioning.

* * * * *